US006817659B2

(12) United States Patent
Vogel et al.

(10) Patent No.: US 6,817,659 B2
(45) Date of Patent: Nov. 16, 2004

(54) DEVICE FOR GUIDING AIRFLOW AROUND A VEHICLE ROOF OPENING

(75) Inventors: Stefan Vogel, Ortenberg (DE); Gunther Pfeifer, Sulzbach (DE); Rainer Arnold, Schotten (DE); Margit Schnabel, Nidda (DE); Tobias Prager, Frankfurt am Main (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/446,993

(22) Filed: May 28, 2003

(65) Prior Publication Data

US 2003/0222480 A1 Dec. 4, 2003

(30) Foreign Application Priority Data

May 29, 2002 (DE) .......................................... 102 23 940
Dec. 9, 2002 (DE) .................................... 202 19 113 U (51) Int. Cl.[7] ................................................. B60J 7/22
(52) U.S. Cl. ..................................................... 296/217
(58) Field of Search ............................... 296/217, 180.1

(56) References Cited

U.S. PATENT DOCUMENTS

| 5,052,745 A | 10/1991 | Preiss |
| 6,286,899 B1 * | 9/2001 | Hirschvogel et al. ....... 296/217 |
| 6,416,120 B1 * | 7/2002 | Schutt ......................... 296/217 |

FOREIGN PATENT DOCUMENTS

| DE | 38 33 046 A | 4/1990 |
| DE | 39 13 567 A1 | 10/1990 |
| DE | 41 26 568 A1 | 2/1993 |
| DE | 4200317 | * 4/1993 |
| DE | 195 20 348 C | 8/1996 |
| DE | 197 32 699 | 2/1999 |
| DE | 199 55 712 A1 | 5/2001 |
| DE | 101 17 364 A | 10/2001 |
| EP | 0 374 421 B1 | 6/1990 |
| JP | 59-216725 | * 12/1984 |
| JP | 59216725 A | 12/1984 |
| JP | 61169319 A | 7/1986 |

OTHER PUBLICATIONS

Australian Patent Office Search Report completed on Jul. 19, 2002.

Search Report completed on Jul. 30, 2003.

* cited by examiner

Primary Examiner—Dennis H. Pedder
(74) Attorney, Agent, or Firm—Carlson, Gaskey & Olds (57) ABSTRACT

A device for guiding an airflow in a region of a roof opening in a motor vehicle roof comprises a wind deflector and at least one additional deflector. This additional deflector has a rear end face and is movably fastened to the wind deflector and adapted to protrude vertically upwards with respect to a rear edge of the wind deflector. The wind deflector and the additional deflector are each movable from a normal, unextended position into an extended position. The additional deflector is fastened to an underside of the wind deflector when in its normal position and moves along the rear end face of the wind deflector when moving into the extended position.

33 Claims, 4 Drawing Sheets

DEVICE FOR GUIDING AIRFLOW AROUND A VEHICLE ROOF OPENING

REFERENCE TO RELATED APPLICATIONS

This application claims priority to German Patent Application No. 102 23 940.1, filed on May 29, 2002, and German Patent Application No. 202 19 113.3, filed Dec. 9, 2002.

TECHNICAL FIELD

The invention relates to a device for guiding the airflow around a roof opening, and more particularly a device that guides air flow around the front edge of the opening of a sliding roof.

BACKGROUND OF THE INVENTION

Known sliding roofs have a wind deflector and at least one additional deflector movably fastened to the wind deflector and adapted to protrude vertically upwards with respect to the rear edge of the wind deflector. The wind deflector and the additional deflector are each movable between an unextended position and an extended position. These additional deflectors are provided to prevent a thrumming noise from occurring when the sliding roof is open by avoiding generation of low-frequency pressure pulses responsible for the thrumming.

Additional known deflectors are concealed by the cover of the sliding roof in the closed position. This is why currently known sliding roof structures having a wind deflector device and why the cover needs a lot of space in the Z-direction, i.e. in the vertical axis of the vehicle. Moreover, the cover readily exposes the additional deflector located between the wind deflector and the cover when the deflector travels backward, which is not always desirable due to air flow conditions.

There is a desire to provide an airflow guiding device that allows a higher degree of flexibility in its construction and shape than currently known devices.

There is also a desire to provide a device which has a simple construction, consists of few parts and can reliably be operated at high comfort. Moreover, there is a desire for such a device to be distinguished by a low weight.

SUMMARY OF THE INVENTION

One embodiment of the invention is directed to a device for guiding an airflow in a region of a roof opening in a motor vehicle roof comprises a wind deflector and at least one additional deflector. The additional deflector has a rear end face and is movably fastened to the wind deflector and adapted to protrude vertically upward with respect to a rear edge of the wind deflector. The wind deflector and the additional deflector are each movable from a normal, unextended position into an extended position. The additional deflector, in its normal position, is fastened to an underside of the wind deflector and moves along the rear end face of the wind deflector when it is moved into the extended position.

To simplify the device's construction and reduce its weight, the inventive device according to one embodiment has a mechanical control that is connected to the additional deflector and has a roof-fixed permanent coupling point. During at least the raising motion, the wind deflector engages the mechanical control and displaces the additional deflector to move the additional deflector toward its extended position by displacement of the wind deflector. The invention therefore does not require a separate electromotor drive for the additional deflector. Instead, movement of the wind deflector itself is converted by a mechanical coupling into a motion of the additional deflector. In other words, a constrained coupling action between the two motions is produced, at least in the direction of the extended position of the additional deflector.

This simple mechanical coupling reduces the expense for a separate drive mechanism to move the additional deflector, and it can be configured to be simple and contain few parts. As noted above, the control device is fixed to the roof through the coupling point and also fixed to the wind deflector to achieve a displacement of the control device by motion of the wind deflector relative to the roof. Alternatively, the mechanical control device can also be coupled to an element that travels on the vehicle roof. An energy storing device may also be incorporated to assist in moving the additional deflector to the extended position and/or the retracted position.

According to one embodiment, the control device is coupled to an energy storing device that is biased to move the control device and to bring the additional deflector into the normal position. This embodiment has the advantage that the additional deflector is able to yield due to the energy storing device. This energy storing device preferably is a spring mechanism which can set the flexible force-transmitting means under permanent tension and/or bring the additional deflector into the normal position when the wind deflector is retracted.

In another embodiment, the additional deflector may be displaced from the normal position from below the wind deflector in the normal position along a path toward the extended position until it protrudes beyond the rear edge of the wind deflector. In other words, the additional deflector travels along a path rather than being pivoted; a combined travel-and-pivot motion would also be possible, of course. Alternatively, the additional deflector may be stored within a case on the underside of the wind deflector and emerge from the case when the wind deflector approaches its extended position.

In a further embodiment, the control device for the wind deflector, and preferably for the additional deflector, raises the wind deflector and/or the additional deflector as a function of the vehicle speed, the position of the cover, the degree of how far the roof is opened and/or the sound pressure in the interior of the vehicle. This is achieved by using appropriate sensors or constrained guide means, ensuring that the deflector is not raised inappropriately if a thrumming noise is not expected or detected.

DETAILED DESCRIPTION OF THE PREFERRED EMBODIMENTS

The invention is directed to a device for guiding airflow around a roof opening in a motor vehicle roof. The general concept of the invention will be described first, followed by a more detailed description with reference to the drawings.

The device comprises a wind deflector and at least one additional deflector. The additional deflector has a rear end face and is movably fastened to the wind deflector so that it can protrude vertically with respect to a rear edge of the wind deflector. The wind deflector and the additional deflector are each movable from an unextended position into an extended position. The additional deflector is fastened to an underside of the wind deflector when it is in its normal position and moves along the rear end face of the wind deflector when it is moved into the extended position.

Because the additional deflector lies protected underneath the wind deflector, it does not necessarily need to be covered by the cover any longer. A small overall height in the Z-direction will be produced if the wind deflector lies in front of the cover when the roof opening is closed; that is, the wind deflector and cover have no shared section where they overlap. When the cover is closed, the cover rests against the end face of the wind deflector and the additional deflector does not protrude between the wind deflector and the cover. This improves the sealing effect of the inventive device.

To simplify the device's construction and reduce its weight, the inventive device according to one embodiment has a mechanical control that is connected to the additional deflector and has a permanent coupling point fixed to the vehicle roof. During at least the raising motion, the wind deflector engages the mechanical control and displaces the additional deflector to move the additional deflector toward its extended position by displacement of the wind deflector. As a result, the invention does not require a separate electromotor drive for the additional deflector. Instead, a motion of the wind deflector itself is converted by mechanical coupling into a motion of the additional deflector.

In other words, a constrained coupling action between the two motions is produced, at least in the direction of the extended position of the additional deflector. This simple mechanical coupling reduces the expense for a separate drive mechanism to move the additional deflector, and it can be configured to be simple and consist of few parts. As noted above, the control device is fixed to the roof through the coupling point and also fixed to the wind deflector to achieve a displacement of the control device by motion of the wind deflector relative to the roof. Alternatively, the mechanical control device can also be coupled to an element that travels on the vehicle roof. This element is, for example, a slider that travels in a guide and that is adapted to be moved by the cable drive of the cover.

The inventive device may be structured so that the additional deflector moves toward the extended position through the mechanical coupling at the beginning of its movement and then arrives at fully extended position by means of an energy storing device. Conversely, the retraction of the additional deflector into the normal position during retraction of the wind deflector can be partly or fully performed by the mechanical control device, acting in the same manner in both directions of motion. It is preferable, however, for the control device to move the additional deflector along its entire path between its normal position and its extended position.

According to one embodiment, the mechanical control device has a flexible force-transmitting means, such as a band, a cable, or a Bowden cable. Those force-transmitting structures can be easily be accommodated in the vehicle roof or in the frame of the sliding roof as well as in curved accommodation channels. Moreover, flexible force-transmitting means generally have very low weight and can be accommodated without great expense in a rattle-free manner, unlike rod assemblies.

Preferably, the wind deflector has at least one deflection sheave for deflecting the force-transmitting means. Further, the additional deflector may be fastened to the force-transmitting means at a place between the ends of the force-transmitting means.

According to one embodiment, the control device is coupled to an energy storing device which biases the control device and brings the additional deflector into the normal position. This embodiment allows the additional deflector to yield due to the force applied by the energy storing device. This energy storing device preferably is a spring mechanism, which can set the flexible force-transmitting means under permanent tension and/or bring the additional deflector into the normal position when tho wind deflector is retracted. Optionally, the energy storing device is part or a wind-up mechanism similar to a vehicular belt retractor or a roller shutter belt retractor.

According to one embodiment, the additional deflector can be displaced from the normal position from below the wind deflector in the normal position along a path toward the extended position. In the extended position, the additional deflector protrudes beyond the rear edge of the wind deflector. This means that the additional deflector travels along a path rather than being pivoted. Note that a combined travel-and-pivot motion is also possible without departing from the scope of the invention. Alternatively, the additional deflector may be disposed in a case on the underside of the wind deflector; the additional deflector would then emerge when the wind deflector approaches its extended position.

Another way of moving the additional deflector is to pivotally fasten the additional deflector to the wind deflector in the region of the rear edge thereof. In this arrangement, it may be advantageous if the pivot axis is the same as the axis of the wind-up mechanism. This results in a space-saving construction and a reduced number of parts.

The portion of the additional deflector that protrudes with respect to the rear edge of the wind deflector in the extended position can be spring-mounted. By providing a spring in the device, the additional deflector can vary its angular position based on the wind velocity. For example, the spring may allow the additional deflector to move toward the horizontal position as the wind velocity increases.

To ensure optimum sealing between the wind deflector and the cover when they lie one behind the other, the wind deflector and the cover are arranged so that the cover directly adjoins the rear end face of the wind deflector. An elastic seal is provided and is preferably arranged between the wind deflector and the cover. Usually, this seal is arranged to be the cover seal. If the additional deflector projects, for example, between the seal and the rear end face of the wind deflector, it would be more difficult to achieve the sealing effect. To ensure a good sealing effect, it is preferable that the additional deflector in the normal position of the wind deflector does not protrude to the rear with respect to the wind deflector and lies under only the wind deflector and not under the cover.

The mechanical control device for the additional deflector has been noted above with respect to a mechanical coupling and with respect to a mechanically constrained guidance.

The control device for the additional deflector can also operate with electrical or magnetic means or via a memory wire. Appropriate control devices can also be provided for the motion of the additional deflector.

The control device for the wind deflector, and preferably for the additional deflector, performs the raising motion of the wind deflector and/or of the additional deflector as a function of the vehicle speed, the position of the cover, the degree of how far the roof is opened and/or the sound pressure in the interior of the vehicle. This is achieved by using appropriate sensors or constrained guide means. This prevents the additional deflector or the wind deflector from being raised too high in a situation where a thrumming noise is not expected or is not detected.

Preferably, the drive cable is divided into at least two separate sections that are connected with each other by means of an elastic coupling device. Interposing an elastic coupling device provides tension relief or a buffer in case the drive cable is overloaded. The coupling device on the one hand ensures compensation for play and on the other hand allows a short-time extension of the drive strand by elastic yielding of the coupling device, in particular during installation of the drive cable where the cable has to be guided without play.

In one preferred embodiment, the coupling device is constructed so that it elastically yields when a downward manual force is applied on the additional deflector when the additional deflector is in the raised position and to relieve the tension on the drive-side section of the drive cable. The coupling device preferably has a long spring excursion so that the additional deflector can be swung completely downward near the retracted position in case an occupant urges the additional deflector downward by hand.

Moreover, the coupling device may be constructed so that it does not elastically yield when the additional deflector is extended and retracted. In other words, the coupling device does not make an additional spring drive for the additional deflector available. With this arrangement, the position of the additional deflector can be predetermined more exactly from one device to the next because the entire drive cable is considered to be rigid during retraction and extension of the additional deflector.

According to a preferred embodiment, the coupling device has two levers that can be rotated relative to each other about a common axis and that are coupled to each other through a spring element. One end of a cable section is attached to each of these levers. This lever arrangement allows a flat, space-saving construction of the coupling device in the vicinity of the wind deflector itself. The coupling device preferably is attached directly in the vicinity of the wind deflector, whereby the inertial mass of the drive branch on the side of the wind deflector is fairly low.

It is particularly advantageous if at least one of the two cable sections is detachably fastened to the coupling device by a connection that does not require any tools. One example is an eye provided on the cable section that engages a protrusion on the coupling device. During transport and assembly, the cable sections can still be present in a decoupled state. Thus, it is possible to delay coupling of the cable sections until the final assembly with the vehicle manufacturer. The danger of an excessive cable load until that moment will be substantially reduced by this measure.

Moreover, disassembly can be done in a very simple way. As stated before, the coupling device is normally arranged immediately in the vicinity of the frame of the sliding tilt roof so that the much longer cable section, guided in the frame, can be installed only with some difficulties. For exchanging the additional deflector, only the short cable section needs to be made loose from the front frame section of the sliding tilt roof as far as to the additional deflector itself and detached.

Further, a particularly preferred embodiment provides an additional deflector that is configured in two pieces. A first piece is provided on the wind deflector and a second piece is pivotally attached on the first piece and protrudes upwards with respect to the wind deflector. The first and second pieces are coupled to each other by means of a lever, for instance a parallelogram, which provides for a swing-out motion of the second piece at the end of the swinging motion of the first piece. This lever connection allows the additional deflector to be folded in the normal position and to be folded apart without requiring a separate drive for the second part.

In a preferred embodiment, the drive cable for the additional deflector can be fastened to an entrainment means traveling in a guide channel of a sliding-tilt roof cover. The entrainment means and the drive cable are displaced upon opening the sliding-tilt roof at the end of the travel path of the cover, thereby raising the additional deflector.

Also, the coupling device may be fastened to the underside of the wind deflector to a pivoting part which, when swiveled upwards, presents much better accessibility for installing and dismantling the drive cable as does, for instance, the frame or the guide channel of the sliding-tilt roof.

Figure 1:
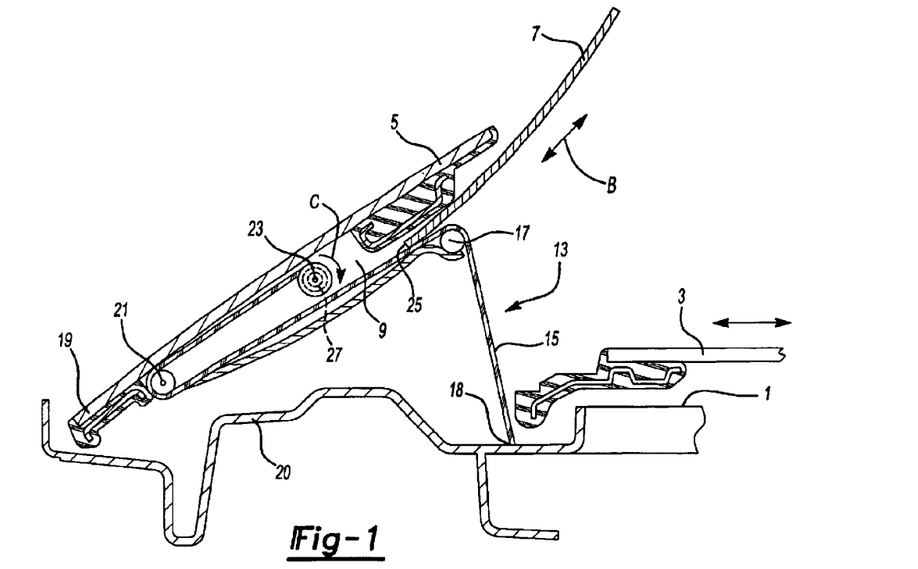
FIG. 1 shows a simplified longitudinal sectional view through a device of the invention according to a first embodiment.

The embodiments summarized above will now be described in greater detail with respect to the Figures. FIG. 1 shows a device for guiding the airflow in the region of a roof opening 1. The roof opening 1 can be opened by a cover 3 of a sliding or sliding-tilt roof. The device is arranged in front of the roof opening 1. The device comprises a wind deflector 5 that extends across the entire width of the roof opening 1. In a normal position, the wind deflector 5 lies flush with the remainder of the outer skin of the vehicle. In the extended position, which is shown in FIG. 1, the wind deflector 5 is raised obliquely towards outside, which can be accomplished by any known mechanism (not illustrated), such as an electromotor or the like. The device also includes additional deflectors 7, which in this example are about 20 cm in width and are arranged in the region of the lateral ends of the wind deflector 5 and are fastened to the latter. In one embodiment, the additional deflector 7 is a plate-shaped element.

On the rear or underside of the wind deflector 5, the wind deflector 5 has a case-shaped accommodation space 9 for each of the additional detectors 7. In the normal position of the wind deflector 5, these additional deflectors 2 are housed in this accommodation space. Thus, the additional deflector 7 is directly mounted to the underside of the wind deflector 5 or indirectly via the case formed by the accommodation space 9. During movement of the wind deflector 5 into its extended position, the associated additional deflector 7 can be moved out of the accommodation space 9 along a path B. The additional deflector 7 does not protrude to the rear beyond a rear edge 11 of the wind deflector 5 in the normal position.

In the following description, the term "normal position" will be used for the wind deflector 5 whenever it is flush with the outer skin or the vehicle and for the additional deflector 7 whenever the latter is completely received in the accommodation space 9. The extended position for the wind deflector 5 is the one in which its rear edge 11, also called an end face, is raised in upward direction. For the additional deflector 7, the extended position is the position in which it distinctly protrudes beyond the rear edge 11 in the upward direction, as illustrated in FIG. 1, after having been moved along the rear edge 11.

Each additional deflector 7 has its own control device 13, such as a mechanical control device, provided on the rear side of the wind deflector 5. The control device comprises a flexible force-transmitting means 15 in the form of a band or rope that is fastened directly to the frame 20 of the sliding or sliding-tilt roof at a roof-fixed coupling point 18. This coupling point on the vehicle roof is close to the roof opening 1 and is a permanent one (i.e., is fixed for the entire pivot angle of the wind deflector and the entire motion path of the additional deflector). The flexible force-transmitting means 15 extends about a rear deflection sheave 17 provided in the vicinity of the rear edge 11, then substantially parallel to the side edge of the wind deflector in the direction towards the front edge 19 where a front deflection sheave 21 is fastened to the wind deflector 5, and around the front deflection sheave 21 as far as to a wind-up mechanism in form of a wind-up shaft 23. The wind-up mechanism may have a construction similar to that of a belt retractor of a window roller shutter as well as an integrated wind-up spring 27.

The wind-up spring 27, which generally represents a spring mechanism acting as an energy storing device, strives to wind up the flexible force-transmitting means 15 in the direction of arrow C. This wind-up mechanism pulls the flexible force-transmitting means 15 taut between its coupling point 18 and its fastening on the wind-up shaft 23 in each position of the wind deflector 5 and the additional deflector 7.

The additional deflector 7 has a rear edge where it is fastened at a point 25 to the flexible force-transmitting means (which is designed as a traction means). This point 25 lies between the ends of the force-transmitting means 15.

In the normal position of the wind deflector 5 and the additional deflector 7, a major part of the force-transmitting means 15 is wound up on the wind-up shaft 23. When the cover 3 is being moved towards the rear, the wind deflector 5 is to be raised. With the start of the raising motion of the wind deflector 5, the rear deflection sheave 17 moves upwards, and the front deflection sheave 21 performs a slight upward motion or no upward motion at all. It is due to this swiveling motion of the rear deflection sheave 17 in the upward direction that the flexible force-transmitting means 15 is increasingly withdrawn from the wind-shaft 23, opposing the force of the wind-up spring 27. That is, the wind deflector 5 engages the mechanical control device, including the flexible force-transmitting means and displaces it. The point 25 at which the additional deflector 7 is attached will move increasingly closer to the rear deflection sheave 17 with the raising motion of the wind deflector 5 so that the additional deflector 7 is moved along path B past the rear edge 11 and further upwards into the fully extended position shown in FIG. 1.

In case the wind deflector 5 is raised to a lower extent, then each additional deflector 7 is extended less than the distance shown in FIG. 1 due to the constrained coupling by the mechanical control device 13. Rather, the additional deflectors 7 are in an intermediate position in which they protrude upwards beyond the rear edge 11 to a slightly lesser extent.

If the wind deflector 5 is lowered again, the rear deflection sheave 17 will also go down again. The wind-up spring 27 again winds up the flexible force-transmitting means 15 and, in so doing, moves the point 25 closer to the front deflection sheave 21 and the associated additional deflector 7 into the accommodation space 9.

It is clear from the embodiments explained above that each of the additional defectors 7 is brought into its extended position by means of a method in which by means of a mechanical coupling (here the control device 13) a shifting force is derived from the motion of the wind deflector 5 relative to the vehicle roof (here, the frame 20); this shifting force actively moves the additional deflector 7 in the direction towards the extended position and even as far as up to it.

Figure 2:
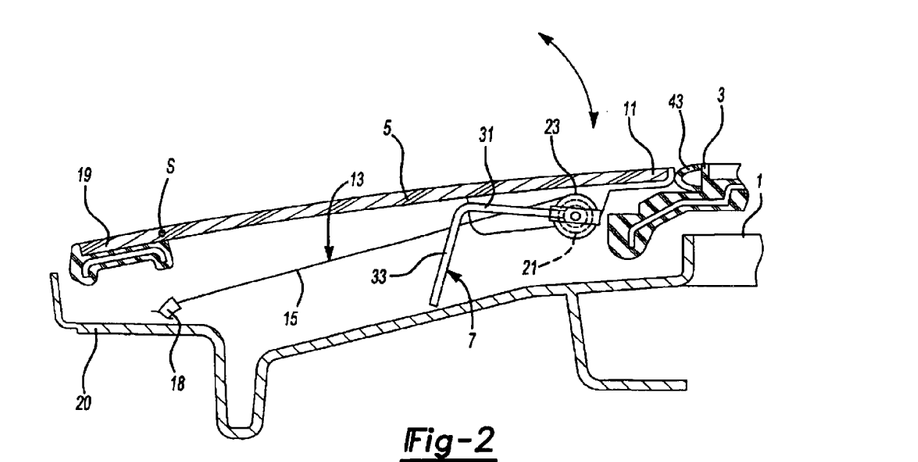
FIG. 2 shows a longitudinal sectional view of the device of the invention according to a second embodiment, with a wind deflector in the normal position.
Figure 3:
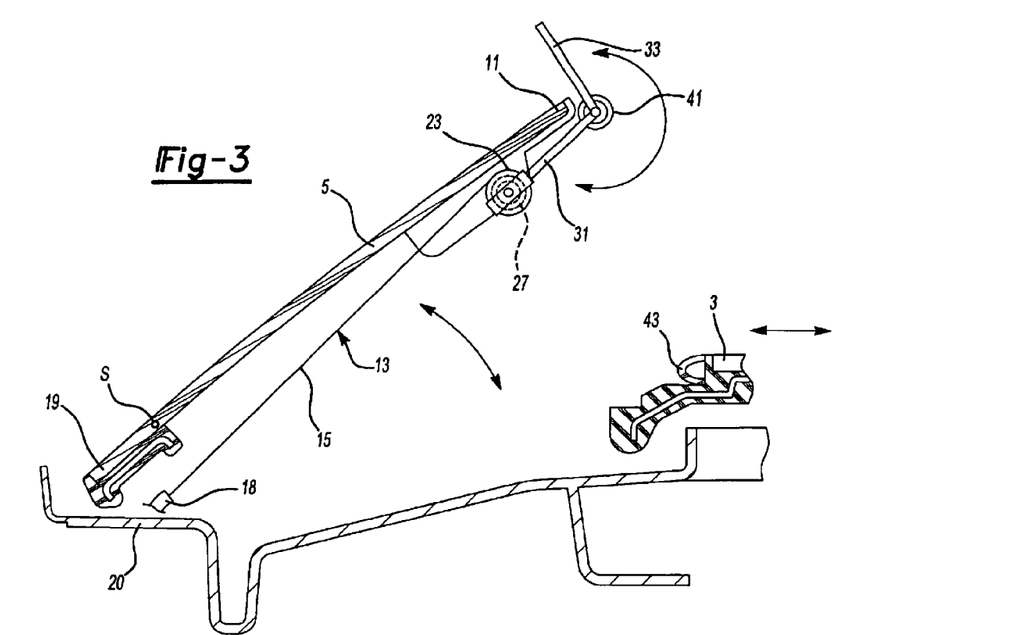
FIG. 3 shows the device of FIG. 2 in the extended position.

The embodiments according to FIGS. 2 and 3 show the device together with the mechanical control device in which a mechanically constrained guidance is produced but which operates without deflection sheaves. The reference numerals will remain the same for parts having the same function. Other than in the embodiment of FIG. 1, the coupling point 18 is provided on the frame 20 near the front edge 19. Provided near the rear edge 11 on the rear side of the wind deflector 5 is the wind-up mechanism, which includes the shaft 23 and the integrated wind-up spring 27. The additional deflector 7 is also connected to the shaft 23 and is configured in this arrangement as a one-piece, rigid and L-shaped angle section (as seen from the side) with two legs of approximately the same length. Close to its free end, one leg 31 is connected to shaft 23 and the other leg 33 extends downwards in the normal position according to FIG. 2; it does not protrude with respect to the rear edge 11 to the rear. As shown in FIG. 3, the coupling point 18 is very close to the pivot axis S of the wind deflector 5. When the wind deflector 5 is raised, it entrains the shaft 23 and sets the flexible force-transmitting means 15 into motion.

The result is a withdrawal of the flexible force-transmitting means 15 from the shaft 23. The additional deflector 7, together with the shaft 23, will be pivoted into the extended position illustrated in FIG. 3 in which the leg 33 is moved upwards about the rear edge 11 until it distinctly protrudes upwards with respect to the rear edge 11. In this embodiment, the pivot axis for the additional deflector 7 is also the axis of the wind-up mechanism During lowering of the wind deflector 5, the additional deflector 7 is folded back by the wind-up spring 27 driving the shaft 23 in the direction of the arrow.

As an alternative, the mechanical control device can also be realized in this embodiment in the form of a Bowden cable. Using a Bowden cable means that deflection sheaves can potentially be dispensed with.

Also, there can be a pivot axis between the legs 31, 33 in which a spring 41 biases the leg 33 into the 90° position. Thereby the leg 33 will be raised to a lesser extent at a higher wind velocity. Because leg 33 is spring-biased with respect to leg 31, it is able to assume different angles of inclination as a function of the wind velocity. This will result in minimized wind noise and reduced draft in the vehicle interior. It would be also possible as an alternative, of course, that the path-guided additional deflector 7 according to FIG. 1 comprises two portions connected by a spring, for attaining an adaptation of the angle of inclination.

A seal 43 is fastened to the front edge of the cover 3 and rests against the rear edge 11 in the normal position when cover 3 is closed.

Figure 4:
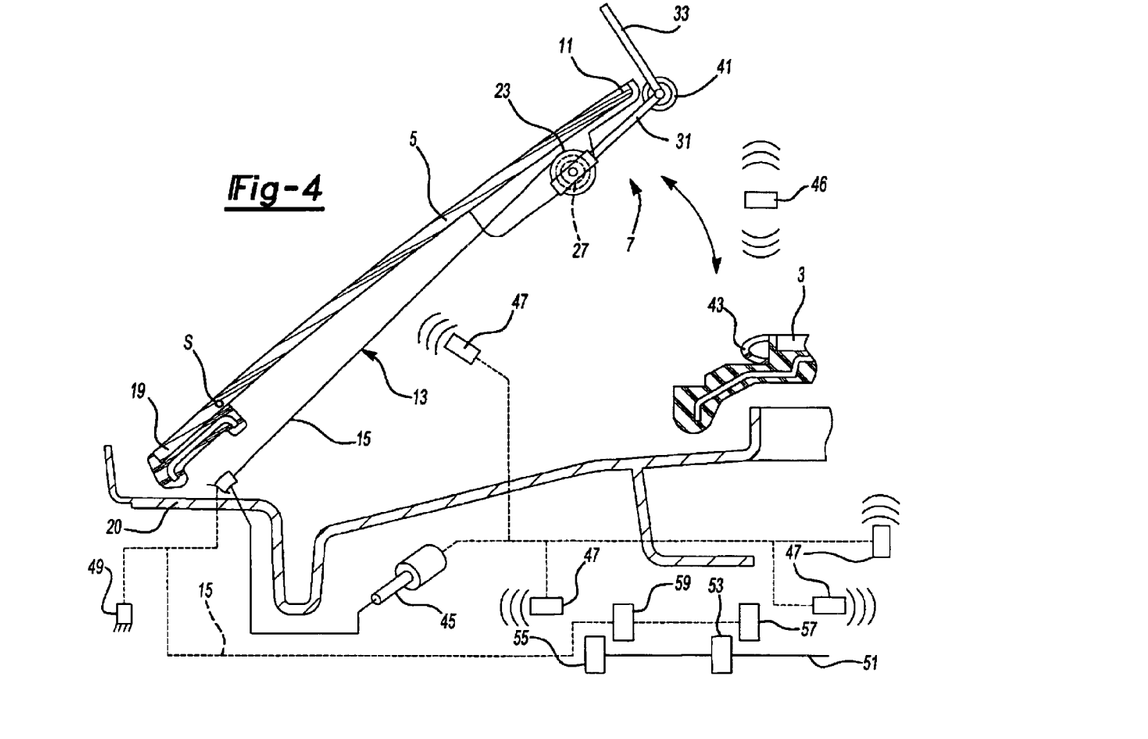
FIG. 4 shows the device according to the invention in further designs.

FIG. 4 combines several embodiments in one drawing. Apart from the flexible force-transmitting means 15, the control device 13 includes an electromotor 45 that winds and unwinds the flexible force-transmitting means 15, with the spring 27 providing for a sufficient biasing. The electromotor 45 can be addressed via a sensor device 47 which, for instance, detects the raising position of the wind deflector 5, the surface opening of the roof opening 1 (i.e. how far opened), the position of the cover 3, the sound pressure in the interior of the vehicle or the vehicle speed. As a function of one or more of these parameters, the additional deflector will be raised, i.e., extended to a smaller or greater extent. The electromotor 45 is firmly coupled to the roof and is therefore a roof-fixed part.

Alternatively, the control device could also be realized as a magnetic device, for instance, by attaching on electrically operable magnet 46 in the region of the rear edge 11. The magnet attracts the additional deflector or repels it to a smaller or larger extent in order to pivot it.

The control device could also have a memory wire 49 coupled to the flexible force-transmitting means 15, for example. A memory wire is understood to be a wire made of a shape memory alloy, for instance NiTi, which shows a substantial change in length dependent on temperature.

Preferably, the additional deflectors 7 do not protrude beyond the rear edge 11 in each embodiment until more than half of the roof opening 1 is exposed, and preferably more than 75% of the roof opening 1, i.e. the cover 3 having been moved almost fully towards the rear.

Raising the wind deflector 5 may also be performed as a function of the parameters mentioned above. In this case, too, an electromotor drive or a mechanical drive with constrained coupling is possible.

The wind deflector 5 and/or the additional deflector 7 can also be coupled to the cable drive of the cover 3. The respective cable 51 driven by an electromotor has, for example, several entrainment means 53, 55 that come up against other entrainment means 57, 59 on the flexible force-transmitting means 15, to move the wind deflector 5 and/or the additional deflector 7 based on the position of the cover 3. Thus, the entrainment means 53, 55 complete with the cable 51 represent an element that can travel on the vehicle roof and has the control device coupled to it. Of course, all the options illustrated in FIG. 4 are also conceivable for the embodiment of FIGS. 1 and 2.

Figure 5:
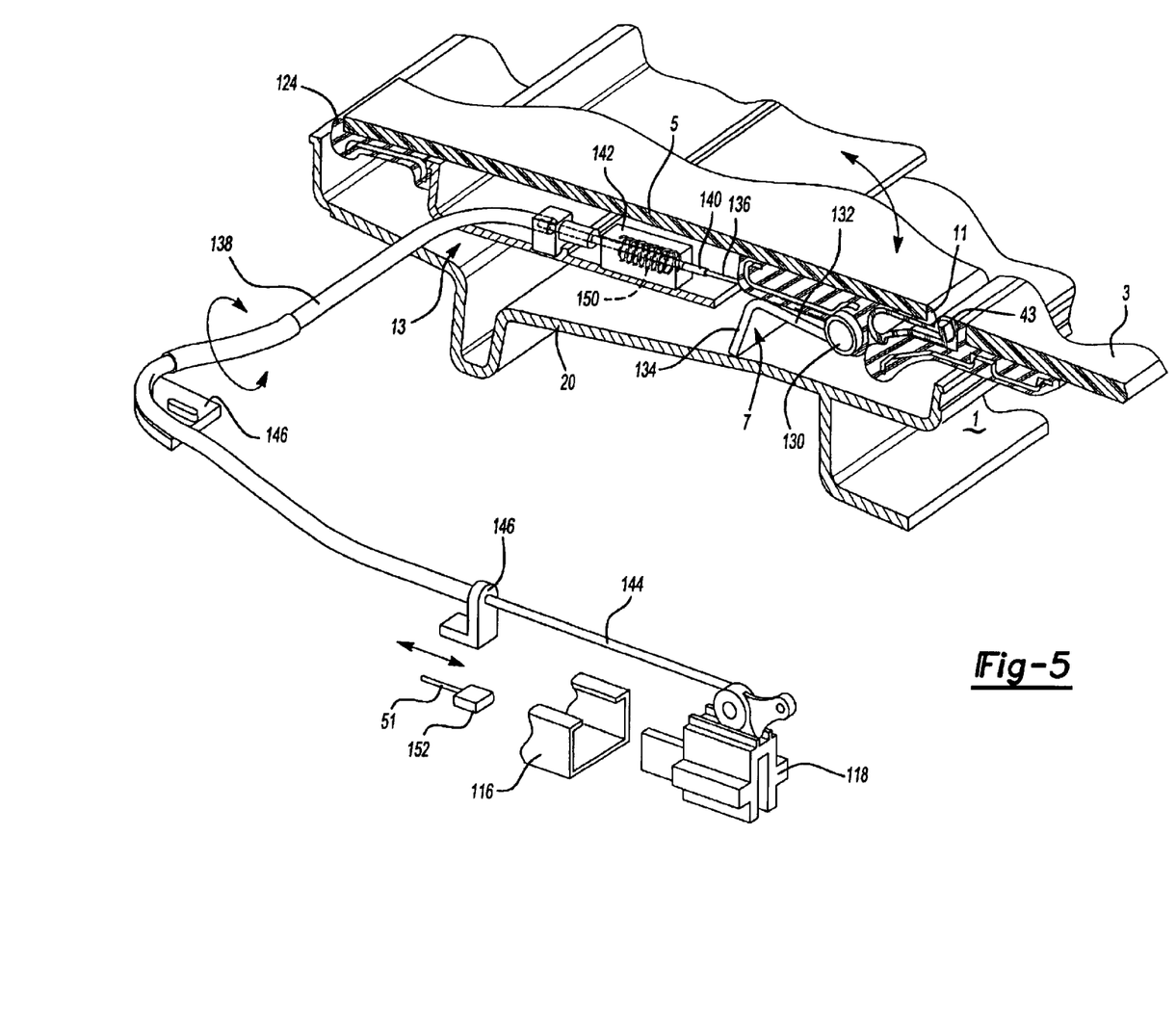
FIG. 5 shows a further embodiment of the device according to the invention in the normal position.
Figure 6:
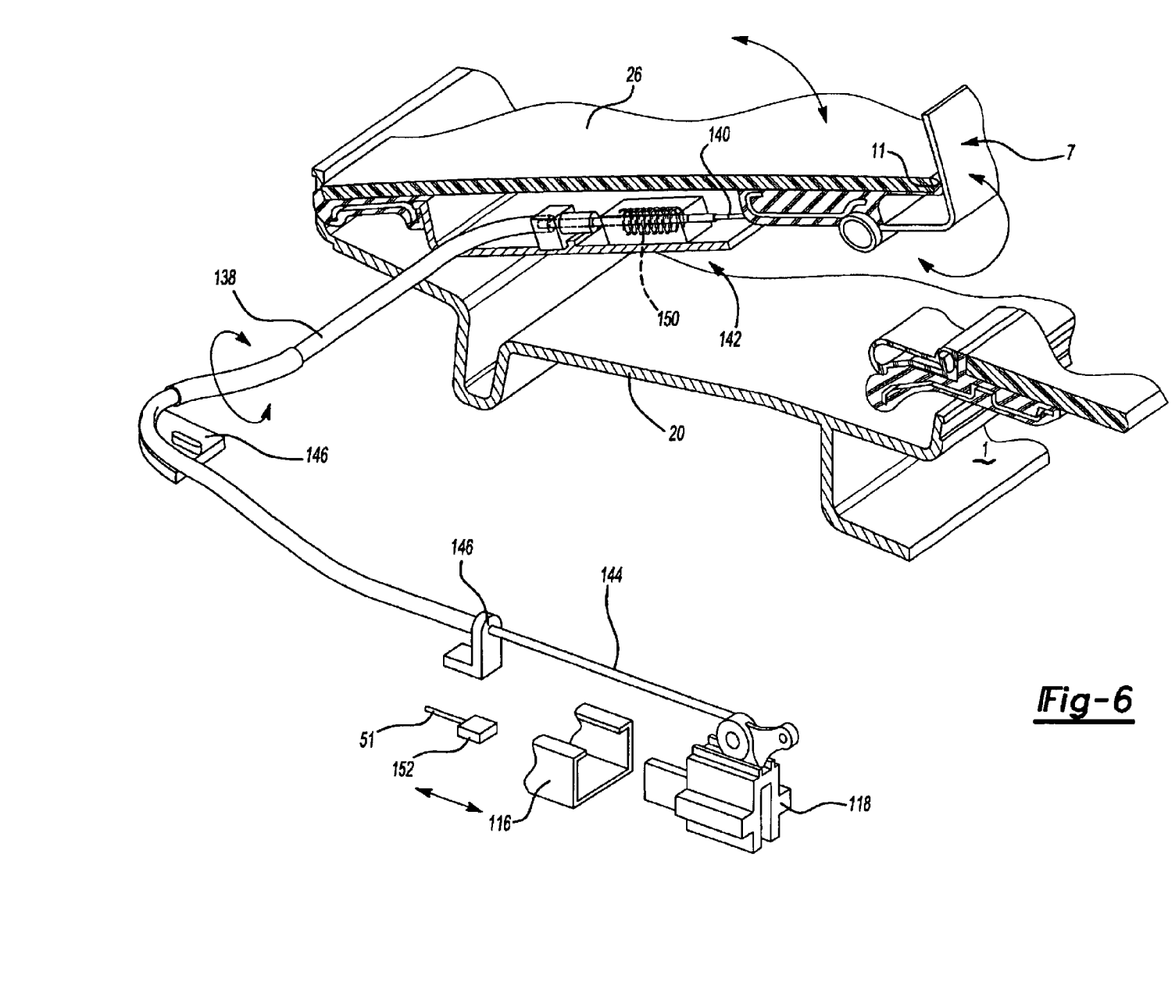
FIG. 6 shows the embodiment of FIG. 5 in the extended position.

The embodiment with the cable drive for the wind deflector and the additional deflector are shown in more detail in FIGS. 5 and 6.

In FIG. 5, there is illustrated a vehicular sliding-tilt roof in the region of the front edge. For better clarity, the components are partly shown in an exploded view. A frame 20 of the sliding-tilt roof surrounds the roof opening 1, which is closed by the cover 3 that can be raised and shifted to the rear. The frame 20, which is immovably fastened to the roof, has integrated lateral guide channels 116 in which there are received several entrainment means 118 and sliders to be displaceable in the longitudinal direction. Several such sliders are fastened to the cover 3 and serve for guiding it in the longitudinal direction. These sliders are not illustrated here because they are known in the prior art. These sliders are moved by a cable guided to be non-buckling, wherein cable 51 moves in the lateral guide channel 116 and is connected with individual sliders so that a raising motion and traveling motion of the cover 3 is obtained by the displacement of the sliders. An electromotor moves the cable 51. Mounted in front of the cover 3 is the wind deflector 5 extending across the entire width of the roof opening 1. This wind deflector is able to pivot about its front edge 124, as illustrated by the arrows. The front pivot axis is not explicitly shown. The wind deflector 5 is pivoted upwards whenever the cover 3 is moved towards the rear.

On the underside of the cover 3 and in the region of its rear edge 11 there are mounted several additional deflectors 7 across the width of the wind deflector 5, which can pivot about a pivot 130. In the position illustrated in FIG. 5 the additional deflector is pivoted downwards, i.e., illustrated in the normal position. The additional deflector is an L-shaped flap with a width of approximately 20 cm in this example. The additional deflector has two sections, namely a first section 132 eccentrically mounted on the pivot axis 130 and a second section 134 which protrudes downward in the position shown. Around the pivot axis 130, there extends a flexible force-transmitting means in the form of a drive cable 136 as a part of a Bowden cable 138. The drive cable has two sections, namely a first cable section 140 on the side of the wind deflector, which extends from the fastening on the additional deflector 7 as far as to an elastic coupling device 142, the latter being fastened to the underside of the wind deflector. The second cable section 144 also called a drive-side section, extends from the coupling device 142 along the front section of the frame 20 via several cable deflectors 146 to the entrainment means 118 in the lateral guide channel 116.

The wind deflector 5, additional deflector 7, the drive cable 136 together with its two sections and the elastic coupling device 142 together constitute a device for guiding the airflow in the region of the roof opening 1.

The first and second cable sections 140, 144 are not directly connected with each other in the elastic coupling device 142. Instead, there is interposed a spring element 150, which is symbolically illustrated in FIG. 5. The spring element provides for relief of tension and for compensation for play.

The mode of operation of the device according to the invention will be briefly explained below. When the cover 3 is being moved to the rear via cable 51, the roof opening 1 will be exposed. To achieve a defined opening position, the wind deflector 5 is pivoted upwards. This is accomplished, for example, through the cable drive of the cover 3. It is preferred that the additional deflector 7 will not be raised until the roof opening 1 is exposed to approximately 75%. A stop 152, which is detachably fastened to the cable 51 and the position of which can be adjusted, finally reaches the entrainment means 118 and displaces the latter and hence the second cable section 144 in the direction of the arrow. The spring element 150 in the coupling device is designed so that there will be no spring action upon raising and retracting the additional deflector 7 and so that the movement of the second cable section 144 will immediately be converted into a movement of the cable section 140. Through, the first cable section 140, the additional deflector 7 will be pivoted upwards, as illustrated in FIG. 6. In case a mechanical force is exerted in a downward direction onto the additional deflector 7, then the elastic coupling device 142 will cause, by the spring element elastically yielding, a downward pivoting of the additional deflector 7 without resulting in a displacement of the second cable section 144 on the entrainment means 118.

In the normal position, the additional deflector 7 is positioned underneath the wind deflector 5 without protruding beyond its rear edge 11 towards the rear. Like the previous embodiments, the cover 3 in this embodiment lies behind the wind deflector 5 as seen in the direction of travel, directly touching the rear edge 11 with its seal 43 without the additional deflector 7 being interposed therebetween in the normal position.

In the embodiment according to FIG. 5, the mechanical control devices for wind deflector and additional deflector are coupled to each other by means of the cable drive. Here, the control device 13 includes the cable 51, the Bowden cable 138 and the elastic coupling device 142.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A device for guiding airflow around a vehicle roof opening, comprising:
    a wind deflector; and
    at least one additional deflector movably fastened to the wind deflector and protruding vertically with respect to a rear edge of said wind deflector,
    wherein the wind deflector and the additional deflector are each movable between a normal position and an extended position, and
    wherein the additional deflector is fastened to an underside of the wind deflector and moves along a rear end face of the wind deflector when moving to the extended position.

2. The device according to claim 1, further comprising a cover that closes the roof opening, wherein the wind defector is disposed in front of the cover when the roof opening is closed by the cover.

3. The device according to claim 2, wherein said cover adjoins the rear end face of the wind deflector, and wherein the device further comprises an elastic seal disposed between the wind deflector and the cover.

4. The device according to claim 1, wherein the additional deflector does not protrude in a rearward direction beyond the wind deflector when the wind deflector is in the normal position.

5. The device according to claim 1, further comprising a cover that adjoins the rear end face of the wind deflector in the normal position of the wind deflector, wherein the additional deflector does not protrude between the rear end face of the wind deflector and the cover.

6. The device according to claim 1, wherein the additional deflector is a plate-shaped element, wherein at least a portion of the plate-shaped element is bent upward toward the rear edge of the wind deflector.

7. The device according to claim 1, further comprising a control device that raises at least one of the wind deflector and the additional deflector.

8. The device according to claim 7, wherein the control device is at least one selected from the group consisting of a mechanical control, an electrical control, a magnetic control, and a memory wire.

9. The device according to claim 1, further comprising a sensor device for controlling a raising motion of at least one of said wind deflector and said additional deflector as a function of at least one factor selected from the group consisting of vehicle speed, cover position, opening surface of said roof opening, and sound pressure in an interior of the vehicle.

10. The device according to claim 9, further comprising at least one control device connected to said additional deflector and coupled with at least one of a vehicle roof and an element that travels on the vehicle roof.

11. The device according to claim 10, wherein said at least one control device has a coupling point fixed to the vehicle roof.

12. The device according to claim 10, wherein said wind deflector displaces the control device at least during a raising motion such that the additional deflector is moved in a direction toward the extended position by displacement of the wind deflector.

13. The device according to claim 1, further comprising:
    at least one control device connected to said additional deflector to raise said additional deflector; and
    an energy storing device coupled to the control device, wherein the energy storing device is biased in a direction that moves the control device and brings said additional deflector into at least one of the normal position and the extended position.

14. The device according to claim 13, wherein the energy storing device is a spring.

15. The device according to claim 1, further comprising at least one control device connected to at least one of the wind deflector and the additional deflector to raise at least one of the wind deflector and the additional deflector, wherein the control device includes a flexible force-transmitting means coupled to one of a vehicle roof and an element provided to travel on the vehicle roof.

16. The device according to claim 15, wherein the force-transmitting means is subject to a tensile force and is one selected from the group consisting of a band, a cable and a Bowden cable.

17. The device according to claim 15, further comprising at least one deflection sheave that deflects the force-transmitting means.

18. The device according to claim 15, wherein the additional deflector is fastened to the force-transmitting means between a first end and a second end of the force-transmitting means.

19. The device according to claim 15, further comprising an energy storing device coupled to the control device, wherein the energy storing device is part of a wind-up mechanism for said force-transmitting means.

20. The device according to claim 1, wherein the additional deflector can be displaced from below the wind deflector in the normal position along a path to the extended position, where the additional deflector protrudes beyond the rear edge of the wind deflector in the extended position.

21. The device according to claim 1, further comprising at least one control device connected with the additional deflector to raise the additional deflector, wherein the control device is a flexible traction means having a first end mounted to the vehicle roof close to the roof opening and a second end coupled to the wind deflector the additional deflector engaging the traction means between the first and second ends in a region of the rear edge, wherein the wind deflector displaces the traction means during raising.

22. The device according to claim 1, further comprising a mechanical coupling connecting the wind deflector and the additional deflector together, wherein a shifting force is derived when the wind deflector moves relative to a vehicle roof to move the additional deflector toward the extended position.

23. The device according to claim 1, wherein the additional deflector is pivotally fastened to the wind deflector in a region of the rear edge.

24. The device according to claim 1, wherein the additional deflector comprises a protruding portion that protrudes beyond the rear edge of the wind deflector in the extended position.

25. The device according to claim 24, wherein the protruding portion is spring-mounted to allow the additional deflector to vary its angular position as a function of a wind velocity.

26. The device according to claim 1, further comprising at least one drive cable that raises the additional deflector.

27. The device according to claim 26, wherein said at least one drive cable moves the additional deflector at a point remote from the wind deflector.

28. The device according to claim 26, wherein the drive cable is divided into at least two separate sections connected together via a coupling device.

29. The device according to claim 28, wherein the coupling device is elastic and resiliently yields when the additional deflector is in the raised position when a downward manual force is applied onto the additional deflector and relieves a tensile force on a drive side cable section.

30. The device according to claim 29, wherein the coupling device does not resiliently yield when the additional deflector is moved between the normal position and the extended position.

31. The device according to claim 28, wherein the coupling device is fastened to an underside of the wind deflector.

32. The device according to claim 26, further comprising a sliding-tilt roof cover, wherein the drive cable is fastened to an entrainment device traveling in a guide channel of the sliding-tilt roof cover, and wherein the entrainment device and the drive cable are displaced at an end of a travel path of the sliding-tilt roof cover when the sliding-tilt roof cover is opened.

33. The device according to claim 1, wherein the additional deflector comprises a first piece disposed on the wind deflector and a second piece pivotally mounted to the first piece and protruding upwards with respect to the wind deflector in the raised position.

* * * * *